Sept. 21, 1937. C. L. RUSSELL 2,093,621
DOUGH ROUNDER
Filed Aug. 31, 1936 2 Sheets-Sheet 1

Charles L. Russell,
Inventor,
Delos G. Haynes,
Attorney.

Sept. 21, 1937.  C. L. RUSSELL  2,093,621
DOUGH ROUNDER
Filed Aug. 31, 1936  2 Sheets-Sheet 2

Charles L. Russell, Inventor,
Delos F. Haynes, Attorney.

Patented Sept. 21, 1937

2,093,621

UNITED STATES PATENT OFFICE 2,093,621

DOUGH ROUNDER

Charles L. Russell, Clayton, Mo.

Application August 31, 1936, Serial No. 98,668

7 Claims. (Cl. 107—9)

This invention relates to bakers' machinery, and with regard to certain more specific features, to dough rounders.

Among the several objects of the invention may be noted the provision of a dough rounder that is of unusually compact structure, all moving parts being enclosed within a stationary casing; the provision of a rounder of the class described having improved drive means, which are adapted to reduce the power consumed for the operation of the rounder, and which are further adapted automatically to compensate for wear during the course of operation; the provision of a dough rounder of the class described including improved means for adjusting, with greater facility, the position of a dough race element; the provision, in a dough rounder of the class described, of a dough race having a pitch or lead angle that varies throughout the length of the race in such manner as to improve the rounding action of the race; and the provision of a rounder of the class described which is relatively simple and economical in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a front elevation of a rounder embodying the present invention, certain parts being broken away;

Figure 3:
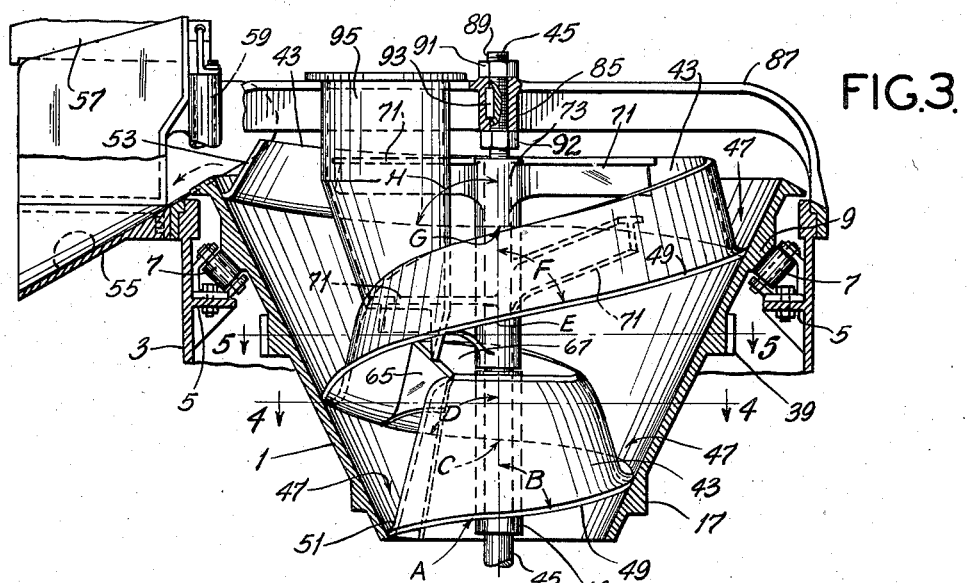
Fig. 3 is a vertical section of a portion of the rounder of Fig. 2.
Figure 4:
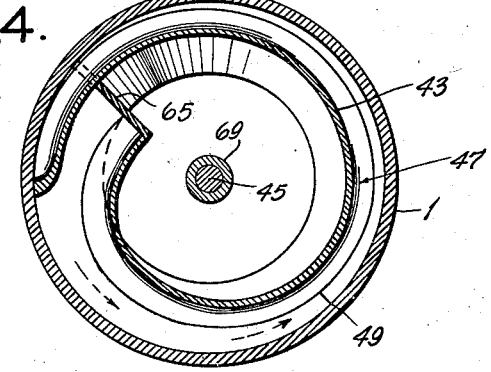
Figure 5:
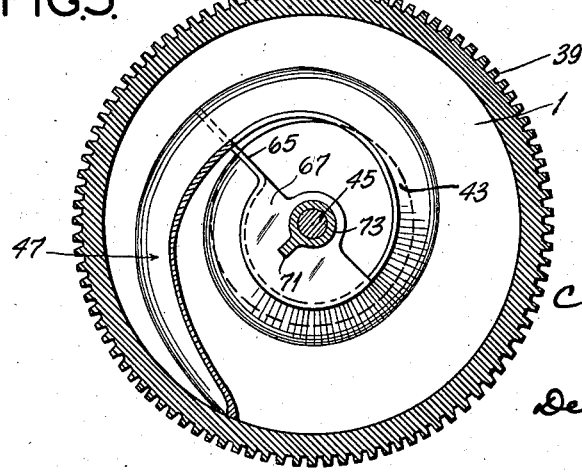

Figures 4 and 5 are horizontal cross sections taken substantially along lines 4—4 and 5—5 of Fig. 3.

Similar reference characters indicate corresponding parts throughout the several views of the drawings.

This invention relates to the general type of dough rounders wherein a conical bowl is rotated on its axis, a spiral dough race being provided within the bowl and in operative engagement with the sides thereof, the spiral race being stationary while the bowl rotates.

Figure 1:
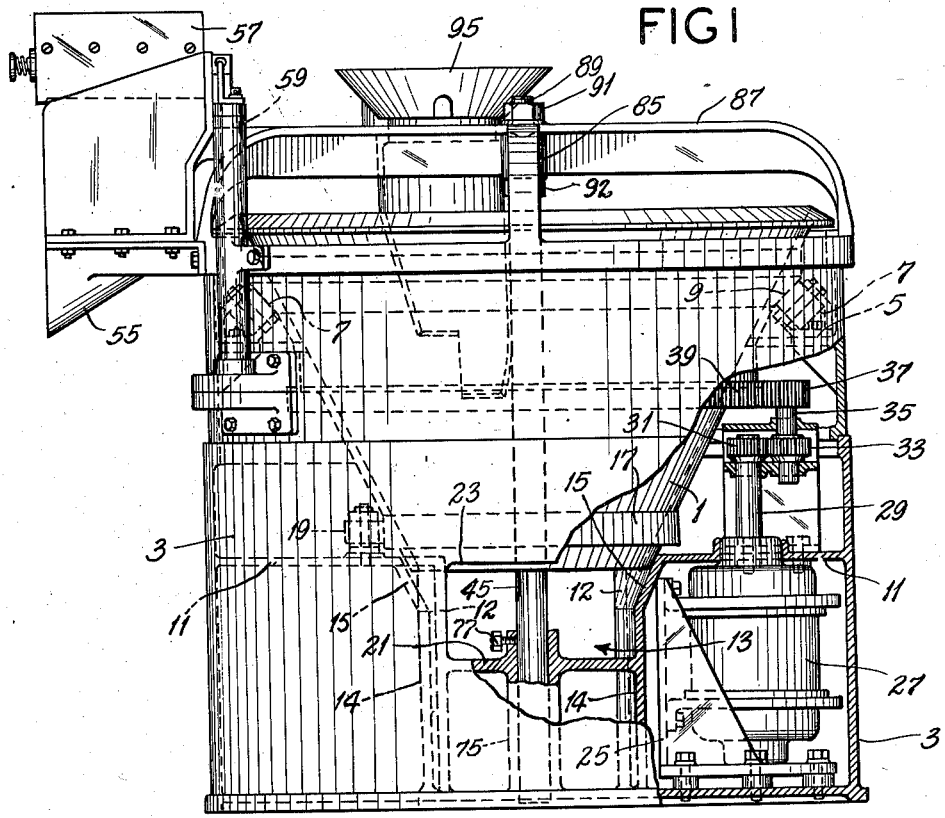
Figure 2:
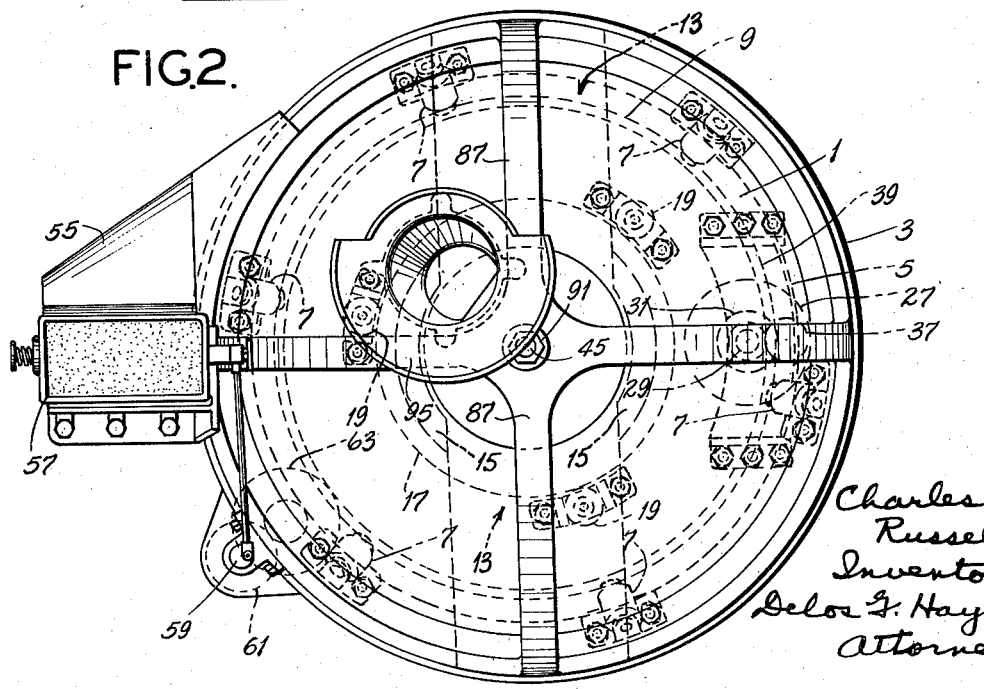
Fig. 2 is a top plan view of the rounder of Fig. 1, with a race member removed for clarity.

Referring, for example, to Figures 1, 2 and 3, numeral 1 indicates the truncated conical bowl forming a principal part of the present invention. The manner in which the bowl 1 is mounted forms one of the features of the present invention. Numeral 3 indicates a cylindrical housing or casing that surrounds the bowl 1. Near the upper edge of the casing 3 there is mounted an interior annular shelf 5, which serves to mount a plurality (six in the present embodiment) of rollers 7. The rollers 7 are disposed at equiangular distances around the shelf 5, with their axes disposed as the elements of a cone. Numeral 9 indicates a sloping face or track that is formed on the outer face of the bowl 1. The angle of the operative face of the track 9 is equal to the angle of the surfaces of the rollers 7, so that the bowl 1 is in effect supported by the engagement of the track 9 with the rollers 7. The rollers 7 are preferably slightly conical, rather than cylindrical.

Numeral 11 indicates a horizontal platform that is provided in the housing 3 substantially at the level of the bottom of the bowl 1. The platform 11 is intersected by walls 12, defining a diametrical passage 13 across the housing 3. The central portion of the passage 13 has cylindrical portions 14 on either side, the top edges 15 of which are flared to receive (but not engage) the lower end of the bowl 1. Mounted on the platform 11 in position to engage a vertical track 17 formed near the lower edge of the bowl 1, are a plurality (three in the present embodiment) of vertical rollers 19. The rollers 19, cooperating with the rollers 7, serve to steady the bowl 1 and prevent it from shifting its vertical axis during rotation.

It will be noted that the bottom of the conical bowl 1 is open in the present invention. A web 21 is provided as a bottom for the passage 13. A hand hole 23 is provided for access to the passage 13 above the web 21, in order to facilitate cleaning the apparatus.

The mechanism for rotating the bowl 1 will next be described. Numeral 25 indicates a vertical bracket that is mounted on the bottom of the casing 3. On the bracket 25 is in turn mounted a motor 27, which has its shaft 29 vertically positioned. The shaft 29 of the motor 27 projects upwardly through the platform 11. The upper end of the motor shaft 29 carries a gear 31, which meshes with a gear 33 on a suitably mounted countershaft 35. The upper end of countershaft 35 carries a pinion 37, which meshes with a ring gear 39 that is formed on, and extends outwardly from, the conical bowl 1. There is thus provided a direct and positive drive from the motor 27 to the bowl 1. It will be seen that this drive is highly efficient for the rotation to be accomplished, principally since it operates at a high mechanical advantage. For this reason, smaller motors 21 may be used to rotate the bowl 1 than has heretofore been possible with other types of drives.

In addition, the disposition of the mounting rollers and of the casing 3 makes it possible to mount the motor 27 entirely within the confines of the maximum circumference of the bowl 1. This results in apparatus which is much more compact than prior apparatus of the same general type. So far as the rounder itself is concerned, it is entirely within the confines of a casing that is not substantially any larger in diameter than the maximum diameter of the conical bowl 1.

The roller mounting of the bowl 1 of the present invention automatically compensates for any normal amount of wear that is encountered in operation. For example, if the face of the track 9 should slowly wear down, the weight of the bowl 1 would cause it to sink vertically an amount sufficient to compensate for the said wear. Repositioning of the rollers 7 will obviously be unnecessary under such circumstances. The same is true of the rollers 19, and of the drive mechanism.

Numeral 43 (Fig. 3) indicates the spiral dough race, the form of which constitutes one of the principal features of the present invention. Generally speaking, the race 43 comprises a strip, such as sheet metal, that is wound in helicoidal manner, but with a spiral shape, around a stationary central shaft 45, from the lower to the upper edge of the conical bowl 1. By reference to Fig. 3, it will be seen that the race 43 forms an angle with the inner wall of the bowl 1, by reason of the fact that only the lower edge of the strip comprising the race engages the bowl 1. This arrangement provides a spiral trough which is indicated by numeral 47. It will be noted that the lowermost edge of the strip forming the race 43, indicated by numeral 49, is flared outwardly somewhat, in order that the trough 47, in cross section, will not have a sharply pointed bottom.

The lower end of the race 43, indicated by numeral 51, is in approximate juxtaposition to the bottom of the bowl 1, and the race 43 at once commences its spiral climb up the wall of the bowl 1, and around the central shaft 45. From this point, the spiral commences with an initially very slight angle of climb with respect to the wall of the bowl 1. For example, at the point indicated by letter A in Fig. 3, the pitch or lead angle B is just slightly less than 90°, preferably of the order of 85°. This slow climb continues until the race 43 has approximately completed the first complete turn of its spiral form. For example, at point C, the lead angle D is still approximately equal to the lead angle B. However, shortly after the completion of the first turn of the race 43, the rate of climb of the race 43 is considerably increased. For example, at point E, which is about 180° advanced from point C, the lead angle F, it will be seen, is considerably less than either the lead angles B or D. For example, the lead angle F is preferably of the order of 70°. The relatively steep angle of climb continues for somewhat more than 180°, and thereafter the angle of climb of the race 43 is again decreased, so that by the time the point G, which is 180° advanced from the point E, is reached, the lead angle H is again increased to the order of 85° or more. The entire race 43 of the present embodiment makes two and a fraction turns around the standard 45. Starting from the lowermost point 51, the first turn is at a slow rate of climb, while approximately the next half turn is at a fast rate of climb, and the remaining three-quarters or so of a turn is again at a slow rate of climb. This varying rate of climb of the race 43 constitutes one of the principal features of the present invention. Its purpose will be explained hereinafter.

It will be seen and understood that the changes in lead angle or rate of climb are preferably gradual and not abrupt, from section to section.

The upper edge 53 of the race 43 is approximately on a level with the upper edge of the bowl 1. Secured to the casing 3 in the radial position represented by the upper edge 53 of the race 43 is a discharge hopper or spout 55, preferably surmounted by a duster box 57. The duster box 57 may be driven, for example, from a rotatable shaft indicated by numeral 59, the lower end of which carries a pinion 61 (see Fig. 2) which engages an idler pinion 63 driven by the ring gear 39 on the bowl 1.

From the lower edge 51 of the race 43, a radial supporting web 65 extends across to the under side of the race 43 at a position about one turn above the lower edge 51. This web 65 does not extend low enough to scrape the bowl 1.

The first 180°, or half turn of the race 43, is provided with a top portion 67, which is welded or otherwise secured to a collar 69 that is made fast to the supporting shaft 45. The collar 69 neither rotates on the shaft 45 nor is it permitted any longitudinal movement thereon. The upper sections of the race 43 are supported by radial arms 71 extending outwardly from collars 75 likewise made fast on the shaft 45.

Referring again to Fig. 1, it will be seen that the lower end of the shaft 45 is received in a bearing or supporting sleeve 75, which is supported on the housing bottom. A set-screw 77 is provided in the sleeve 75. The upper end of shaft 45 passes through a bearing 85 in a cover member 87 (which is made up of four radial arms), the cover member 87 resting on the upper edge of the casing 3 and being made fast thereto. The upper end of the shaft 45 is threaded, as indicated at numeral 89, and receives a nut 91 above the bearing 85, and a second nut 92 below the bearing 85. Preferably, a spline 93 is provided between the shaft 45 and the bearing 85, this spline 93 effectively preventing any rotation of the shaft 45 with respect to either the cover member 87 or the casing 3.

The arms of the cover member 87 likewise serve to support an inlet hopper 95, which extends downwardly, in a direction generally parallel to the shaft 45, to a position such that it delivers dough to the trough 47 in the region of the lower end of the race 43.

The nuts 91 and 92 constitute means for vertically adjusting the race 43 in the bowl 1. For example, if it is desired that the lower edge of the race 43 tightly scrape the walls of the bowl 1, then the nut 91 is loosened and the nut 92 is threaded upwardly on the shaft 45 to drive the race 43 (which is fixed to the shaft 45) downwardly, bringing its lower edge into relatively tight engagement with the bowl 1. Thereafter, the nut 91 is drawn down tightly, and the race 43 is thus established in immovable position relative to the bowl 1. No relative adjustment may ordinarily be made between the race 43 and the shaft 45. Any adjustment between the race 43 and the bowl 1 is accordingly effected by vertical adjustment of the position of the shaft 45.

In operation, lumps of dough, dropped into the hopper 95, are delivered into trough 47 at the lower end of the race 51. Because of the relatively slight rate of climb at the commencement of the race 43, the pieces of dough dropping from the hopper 95 will be very quickly taken up and will commence rolling up the trough 47. This eliminates, or at least substantially reduces, any chances for doubling, which is the term applied to the situation where two successive lumps of dough are piled one on top of another in the trough 47. The initial slight rate of climb means that lumps of dough dropped into the lower end of the trough 47 will at once be picked up, clearing the way for succeeding pieces of dough. During the initial turn of the race 43, the piece of dough is handled gently and it is subjected to initial forming forces. By the time it reaches the point at which the angle of climb of the race 43 increases, it has been sufficiently nearly rounded that it is capable of withstanding a considerably more violent action. During the intermediate portion of the race 43, the lump of dough is handled in such a manner as to knead it somewhat more drastically, with the effect that the skin of the lump is more completely drawn. The final upper portion of the race 43, being again at a low angle of climb, finally handles the piece of dough more gently, bringing it into final spherical form without disturbing the well-formed skin which has been created by the action of the intermediate section of the race. Finally the well-formed lump is delivered over the edge of the bowl 1 into the discharge hopper 55.

Because the dough race 43 is stationary at all times, and the bowl 1 rotates, the discharge hopper 55 may be positioned in a stationary manner at one circumferential point on the side of the housing 3. This is of great advantage in the handling of dough, as it means that the rounded-up lump can be delivered onto a permanently positioned conveyor or the like.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a dough rounder, a conical bowl, and a spiral dough race engaging the inner surface of said bowl, means for imparting relative rotational movement between said race and said bowl, said dough race being of a spiral character and having a varying angle of climb along the inner face of the bowl.

2. In a dough rounder, a conical bowl, and a spiral dough race engaging the inner surface of said bowl, means for imparting relative rotational movement between said race and said bowl, said dough race being of a spiral character and having a varying angle of climb along the inner face of the bowl, the said dough race being stationary, while the bowl rotates thereabout.

3. In a dough rounder, a conical bowl, and a spiral dough race engaging the inner surface of said bowl, means for imparting relative rotational movement between said race and said bowl, said dough race being of a spiral character and having a varying rate of climb along the inner face of the bowl, such that the lowermost portion of the race has a relatively slow rate of climb, and the intermediate portion of the race has a relatively fast rate of climb.

4. In a dough rounder, a conical bowl, and a spiral dough race engaging the inner surface of said bowl, means for imparting relative rotational movement between said race and said bowl, said dough race being of a spiral character and having a varying rate of climb along the inner face of the bowl, such that the lowermost portion of the race has a relatively slow rate of climb, the intermediate portion of the race has a relatively fast rate of climb, and the uppermost portion of the race again has a slow rate of climb.

5. In a dough rounder, a conical bowl, and a spiral dough race engaging the inner surface of said bowl, means for imparting relative rotational movement between said race and said bowl, said dough race being of a spiral character and having a varying rate of climb along the inner face of the bowl, such that the lowermost portion of the race has a relatively slow rate of climb, the intermedaite portion of the race has a relatively fast rate of climb, and the uppermost portion of the race again has a slow rate of climb, the said race being relatively stationary, while the bowl rotates about said race.

6. A rounder as set forth in claim 4, in which the pitch or lead angle of the lowermost section of the race is of the order of 85° or more, the pitch or lead angle of the intermediate section of the race is of the order of 70°, while the pitch or lead angle of the uppermost section of the race is of the order of 85°.

7. A dough rounder as set forth in claim 4, in which the rate of climb changes gradually between the lower, intermediate, and upper sections of the race.

CHARLES L. RUSSELL.